C. E. WENZEL.
PARING DEVICE.
APPLICATION FILED APR. 10, 1917.
1,256,751.
Patented Feb. 19, 1918.
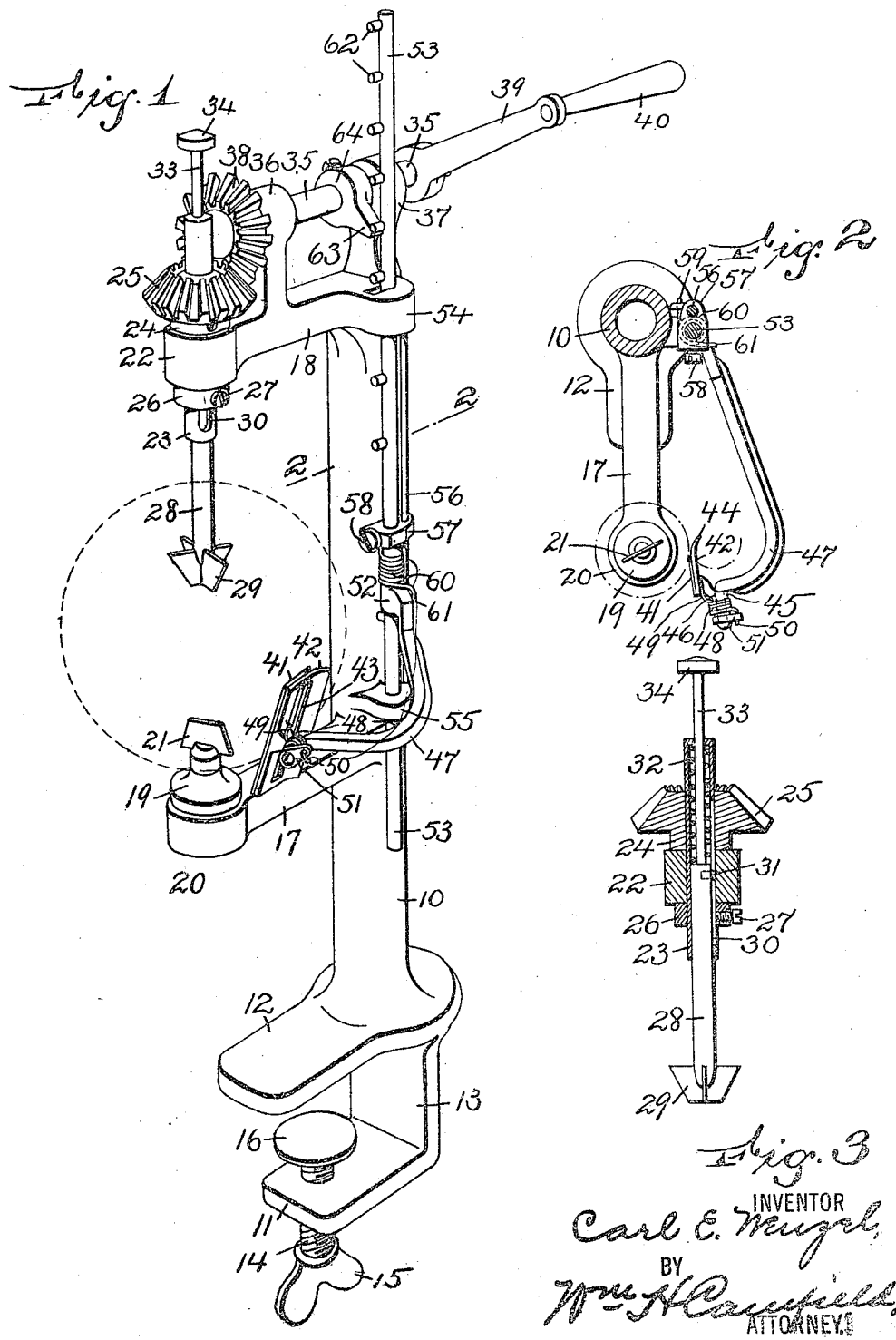
INVENTOR
Carl E. Wenzel,
BY
Wm H Caufield
ATTORNEY

UNITED STATES PATENT OFFICE.

CARL E. WENZEL, OF NEWARK, NEW JERSEY.

PARING DEVICE.

1,256,751. Specification of Letters Patent. Patented Feb. 19, 1918.

Application filed April 10, 1917. Serial No. 160,932.

*To all whom it may concern:*

Be it known that I, CARL E. WENZEL, a citizen of the United States, and a resident of Newark, county of Essex, and State of New Jersey, have invented certain new and useful Improvements in Paring Devices, of which the following is a specification.

This invention relates to an improved device for paring vegetables, fruit and the like, and is designed to provide a machine that is easily operated, the driven or handle part thereof being connected with the other parts of the device in a manner to cause their proper and timed movements to coöperate so as to remove a paring from the entire surface of a vegetable or fruit.

The invention is further designed to provide a paring device in which the paring is thin so that none of the pulp or body of the fruit or vegetable is cut away to an extent greater than is absolutely necessary, and one in which the fruit or vegetable will be completely pared even though it is not perfectly round, a paring knife being mounted so as to traverse the entire surface of the article being pared without removing or shifting the article.

The invention is further designed to provide a paring device that is light, is easily portable and in which the parts are simple in construction so that their operation is assured.

The invention is illustrated in the accompanying drawing in which one embodiment of my invention is shown.

In said drawing, Figure 1 is a perspective view of the paring device, the article being pared being shown in dotted outline. Fig. 2 is a section on line 2—2, in Fig. 1, being on a slightly reduced scale, and Fig. 3 is a vertical section through the upper part of that part of the machine that holds the article to be pared.

The machine or device comprises a standard 10 which is adapted to be fastened to a table or any other suitable support, one means of fastening being by means of a clamping device comprising parallel cheeks 11 and 12 connected by a web 13, one of which cheeks, as 11, is provided with a screw 14 having a finger-piece 15 thereon and having a plate or similar suitable bearing surface 16 by means of which the post or standard can be detachably or rigidly secured in place. Suitable means for holding the fruit, and also for paring it by means of a paring knife that traverses the fruit, are mounted on the standard and are so disposed that they are rotatable relative to each other and actuated so that the knife traverses the article to be pared and has sufficient flexibility to adjust and adapt itself to any depressed or projecting parts so as to entirely remove the skin from the article. One form of such means is illustrated in the drawing, the fruit supporting mechanism being mounted on a lower arm 17 and an upper arm 18, the lower arm 17 having a foot 19 thereon which is freely rotatable, being preferably mounted in ball bearings which are not shown, since they may be of any desired form, the foot 19 having its roller or other bearing supported in the boss 20 of the arm 17. The foot has, at the top thereof, means for gripping a fruit or vegetable, and such means may take the form of a flat plate 21, although other and equivalent means may be used, as will be evident. The upper arm 18 has a suitable means for gripping the article to be pared, such means being rotatable and also being longitudinally movable so that it can be withdrawn to provide for the insertion of an article and then forced to a position where it securely grips the article. One embodiment of such means is mounted to rotate in a bearing 22 on the upper arm 18, the bearing 22 being provided with a sleeve 23 which rotates in the bearing 22 and is prevented from moving longitudinally by a suitable collar 24 fastened to it, the collar 24 in this construction being secured to a bevel gear 25, the sleeve being prevented from moving in the opposite direction by a collar 26 suitably fastened to the sleeve, such fastening means being shown at 27.

Within the sleeve is a stem 28 on the bottom end of which is a gripping device which may be in the form of plates 29, although other suitably shaped prongs can be employed. The stem 28 is prevented from turning in the sleeve 23, such preventive means also acting to permit the relative sliding of the parts, in the form shown such means consisting of a slot 30 in the sleeve 23 and a pin 31 projecting from the stem 28 into the slot 30. A spring 32 abuts on the sleeve 23 and bears on the stem 28 so as to normally push down on the stem, but such spring is not essential to the successful operation of the device. The upper end 33 of the stem is provided with a suitable finger-piece 34 by means of which the stem can be operated. A driving shaft 35 is mounted in bearings 36 and 37, the shaft 35 having a bevel gear 38 which meshes with the gear 25, the shaft 35 also having a handle lever 39 with a handle 40 on it, by means of which handle the shaft is rotated, and as the shaft is rotated the bevel gears act to rotate the sleeve 23, and since the foot 19 with its plate 21 are also freely revoluble, the fruit is turned. The paring knife is flexibly mounted which gives sufficient flexibility to the knife to enable it to traverse the fruit from top to bottom, since the knife can operate in a vertical or a horizontal position and swings in a vertical plane. The form of knife shown comprises a blade 41 which is provided with a suitable guard 42 which has a slot 43 in it just in rear of the cutting edge of the blade, the front 44 of the guard being turned to provide a sliding surface to the article to be pared and also limiting the distance the knife blade enters the fruit or vegetable. The guard 42 which supports the knife is connected to a sleeve 45 which rotates on a stem 46 that projects from the arm 47, the knife being normally swung downward by the spring 48, one end 49 of which engages the back of the guard, the other end 50 being fastened to a stop 51. The arm 47 swings in a horizontal plane, having a sleeve 52 which rotates on a bar 53, the bar in turn sliding in bearings 54 and 55. A guiding bar 56 passes through a clip 57 which has an opening for the bar 53, and a set screw 58 holds the clip on the bar, this clip thus preventing any rotation of the bar 53 and also acting as an abutment for the end 59 of the spring 60, the other end 61 of the spring engaging the arm 47 so that the arm with its knife is yieldingly pressed against the fruit held in the holding device.

The bar 53 is moved longitudinally by a suitable step by step arrangement, one form being illustrated in the drawing and comprising studs 62 which are arranged in spaced relation on the bar and are adapted to be engaged successively by a nose or finger 63 rotatable with the main shaft 35, being preferably provided with a collar 64 by means of which it is attached to the shaft. The studs 62 being spaced so that one is lifted by the nose 63 and is released therefrom by reason of the divergence of the paths, the next adjacent stud is in position to have its under side engaged by the nose 63 on the next revolution of said nose.

The operation of the device will be readily understood, as the operation of the handle 40 causes the rotation of the main shaft 35 which rotates, by means of the bevel gears 38 and 25, the gripping device of the fruit or vegetable, and as the gears are preferably of the same diameter, one rotation of the handle causes one rotation of the article to be pared, although, if necessary, this ratio of speeds can be altered. After the fruit is in position and before the handle is operated, the bar 53 is slid down so that the knife can be placed substantially horizontal close up against the foot 19 with the blade 41 resting against the fruit. As the handle is operated one rotation, the fruit rotates at once and a paring is removed by the blade from the fruit. At the end of this rotation the nose 63 engages the stud 62 and raises the bar 53 which carries with it the arm 47 and the knife so that on the next rotation of the article to be pared, the knife has been raised sufficiently to take off another width of paring, and by this step by step movement the knife is moved so that it traverses the whole article to be pared, since the knife, when it gets near the upper portion, inclines inward under the influence of the springs 60 and 48 so as to constantly bear evenly and with sufficient force against the surface of the article to be pared. The swinging of the arm 47 in a horizontal plane and the swinging of the guard and the blade in a vertical plane provides a yielding means for insuring the engagement of the knife in ordinary depressions and projections on the surface of the fruit or vegetable, so that ordinary inequalities do not interfere with the paring of the article.

The details of the parts and the arrangement of them can be changed without departing from the scope of the invention as embodied in the claims.

Having thus described my invention, I claim:

1. A paring device comprising a gripping device, a paring mechanism, means for causing parts to rotate relative to each other, means for yieldingly holding the paring mechanism against an article held in the gripping device, said paring mechanism including a tilting knife, and means for intermittently moving the paring mechanism to cause the knife to traverse an article held in the gripping device.

2. A paring device comprising a rotating gripping device, a longitudinally moving paring mechanism of limited flexibility, and means for rotating the gripping device and intermittently moving the paring mechanism substantially parallel with the axis of rotation of the gripping device.

3. A paring device comprising a standard having a freely rotatable foot and a rotatable stem and longitudinally slidable means for rotating the stem, a horizontally swinging arm, a vertically swinging blade on the arm, and means for intermittently moving the arm parallel with the axis of rotation of the stem when the stem is rotated.

4. A paring device comprising a rotatable foot, a rotatable and slidable stem, means for rotating the stem, a bar, an arm swinging on the bar, a blade swinging on the arm, springs to swing the arm and the blade, and means operated from the stem rotating means for giving an intermittent movement to the bar to cause the blade to traverse an article held between the foot and the stem.

5. A paring device comprising a gripping device to hold an article to be pared, means for rotating the gripping device, said means comprising a main shaft, a nose on the main shaft, a longitudinally moving paring mechanism, and means on the paring mechanism adapted to be engaged by the nose on the shaft, whereby the paring mechanism is moved longitudinally of the article to be pared once in each rotation of said article.

In testimony that I claim the foregoing, I hereto set my hand, this 19th day of February, 1917.

CARL E. WENZEL.

Copies of this patent may be obtained for five cents each, by addressing the "Commissioner of Patents, Washington, D. C."